Figure 1:
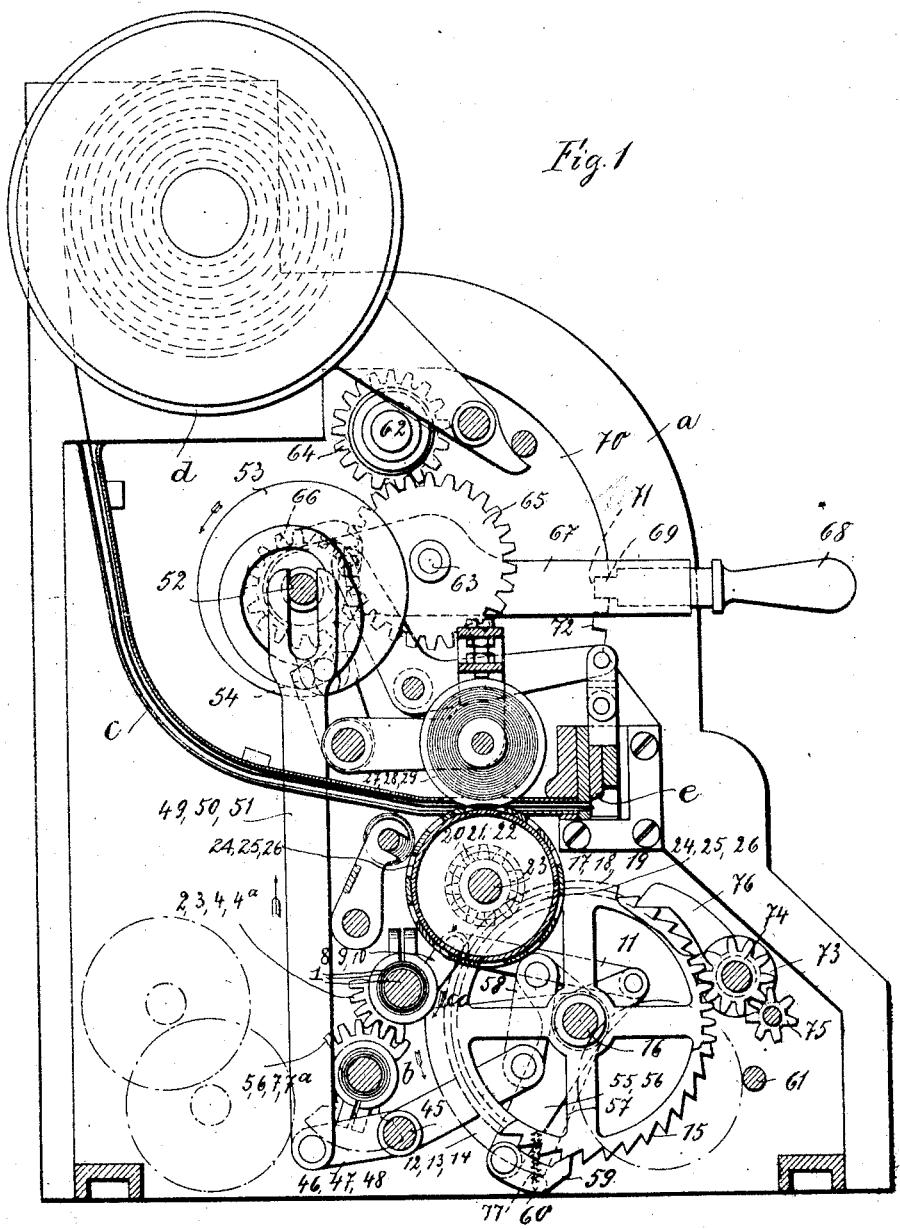

C. TROG.
CASH REGISTER.
APPLICATION FILED OCT. 25, 1910.

1,027,160.

Patented May 21, 1912
5 SHEETS—SHEET 1.

Witnesses:
Corinne Myers.
Thomas Donnellan.

Inventor
Carl Trog
by L. K. Sohm
Attorney

C. TROG.
CASH REGISTER.
APPLICATION FILED OCT. 25, 1910.

1,027,160.

Patented May 21, 1912.

5 SHEETS—SHEET 3.

Witnesses:

Inventor:
Carl Trog
by L. K. Sohn
Attorney

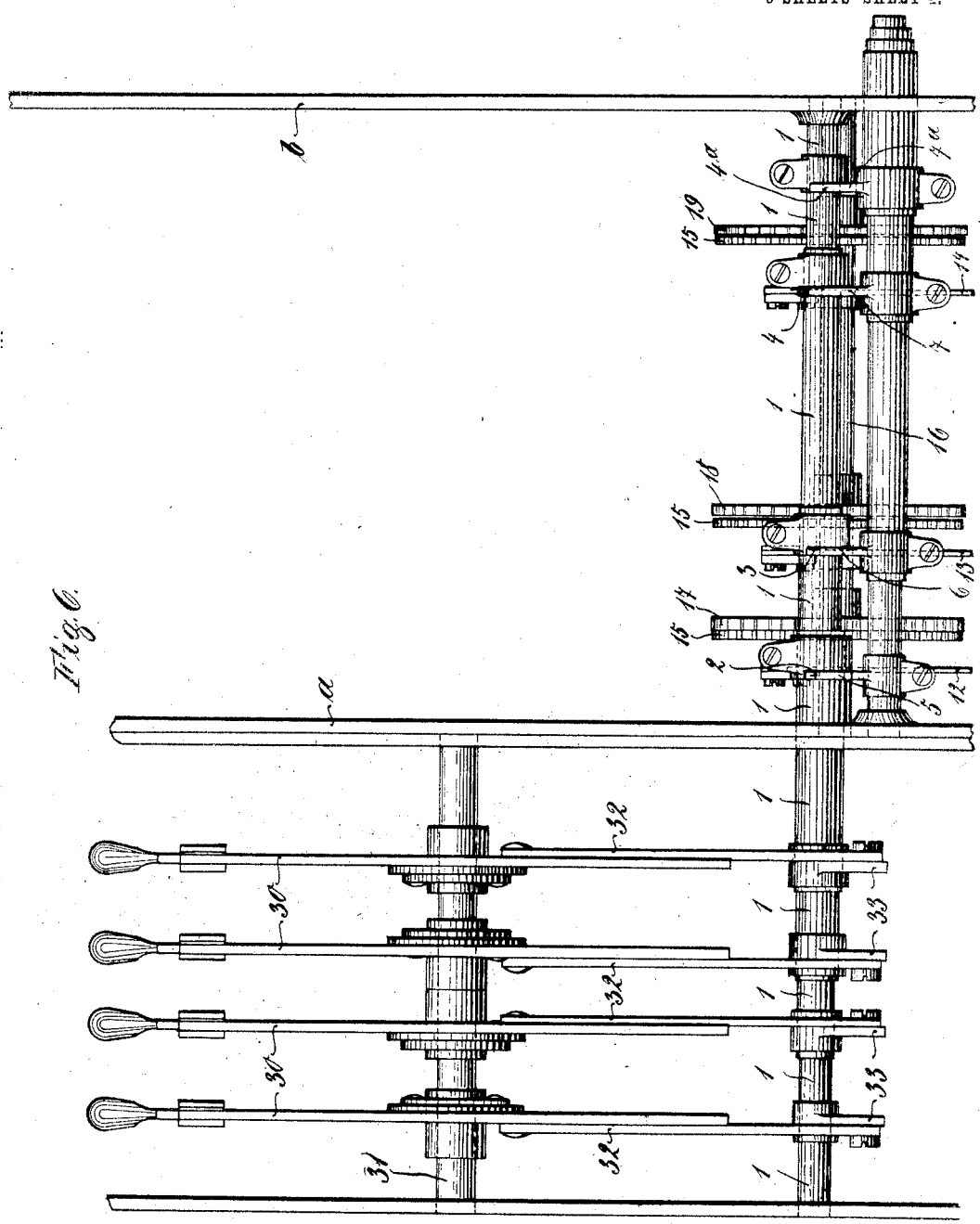

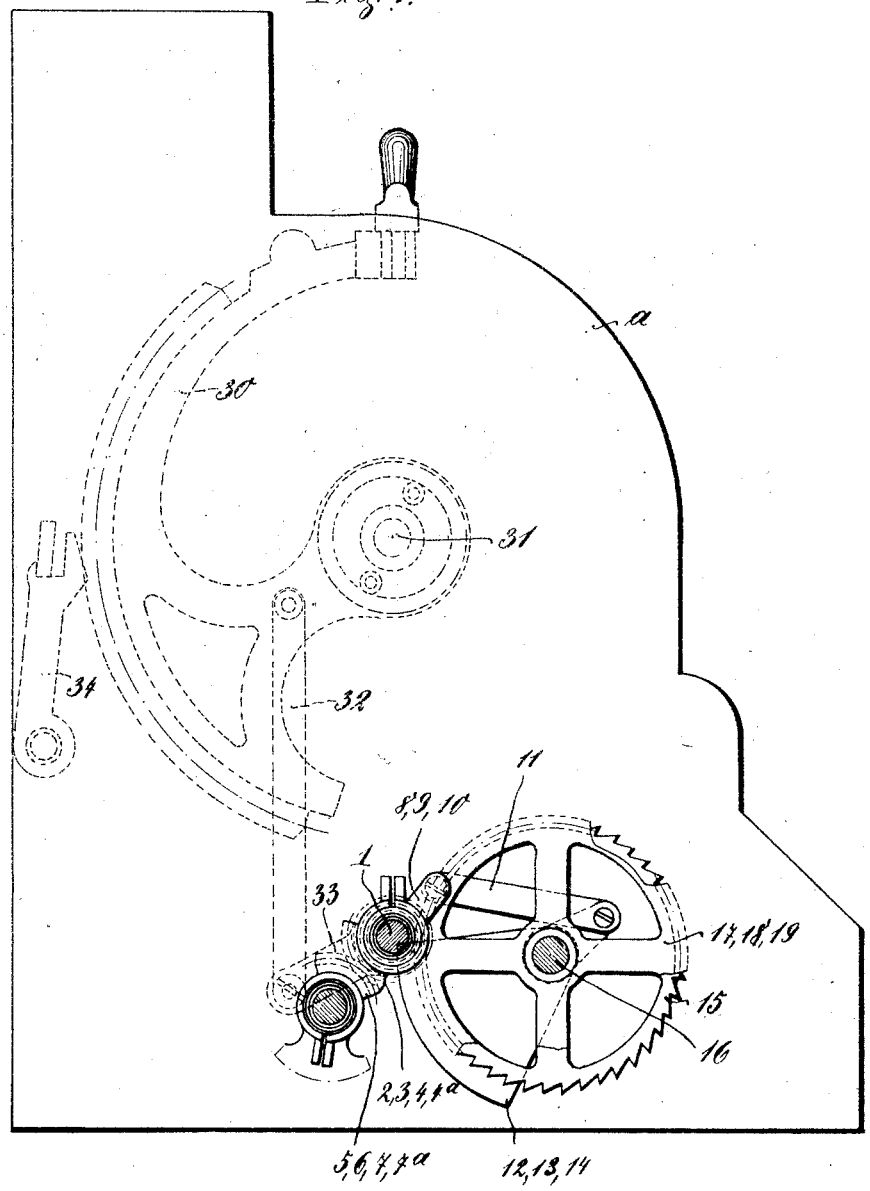

UNITED STATES PATENT OFFICE.

CARL TROG, OF BIELEFELD, GERMANY, ASSIGNOR TO ANKERWERKE A. G. VORMALS HENGSTENBERG & CO., OF BIELEFELD, GERMANY.

CASH-REGISTER.

1,027,160.  Specification of Letters Patent.  Patented May 21, 1912.

Application filed October 25, 1910. Serial No. 589,000.

*To all whom it may concern:*

Be it known that I, CARL TROG, a subject of the King of Prussia, and resident of Bielefeld, in the Province of Westphalia, German Empire, have invented new and useful Improvements in Cash-Registers, of which the following is a specification.

The kind of cash registers to which the present invention refers is those which print, count and deliver coupons corresponding in number to the multiple which the purchase is of any predetermined amount. The invention has for its object to provide means in combination with a cash register for issuing coupons of a certain value, adapted to be collected by the customer, such as by pasting into a book, the book being produced to the seller at periodic seasons for the purpose of receiving discount on the amount purchased.

For the sake of illustration the German momentary system will be taken, in which 100 pfennigs are equal to 1 mark and it will be assumed that for small purchases up to say M9,99 a number of coupons will be delivered corresponding to the multiple of complete 20 pfgs. in the purchase; that is in the case of a purchase of M1.33 six coupons would be delivered. In order to restrict the number of coupons delivered for greater purchases, e. g. 10M. and above, a single coupon is delivered and marked 10M. for each complete 10M. of the purchase, this single coupon being conveniently of a different color to the 20 pfg. coupons.

It is preferable to issue coupons for a round number such as 20 pfg. in order that the work of calculating the amount purchased may be readily accomplished by the seller when discounting.

In cash registers of this kind to employ means for printing, counting and delivering the proper number of coupons for any given purchase is known, but in such means the printing and delivering mechanisms have been operated through the mechanism which adds the amount purchased, which places too great a strain on such adding mechanism.

According to the present invention the coupon counting and printing mechanisms are mechanically connected to a member which is driven through a distance corresponding to the amount of the purchase registered, this member being operated for the desired distance by the co-action of a driving member which moves over a constant distance at each effective actuation of the register, adjustable uncoupling and coupling mechanism being interposed between the said driving member and the operating member for the coupon printing, counting and delivering mechanism. In this way the mechanism adding the amount purchased is not required to bear the stresses necessary to operate the coupon printing, counting and delivering mechanism.

More particularly the invention consists in a driven wheel and a driving pawl arranged to move always over a distance corresponding to a fixed number of teeth but prevented from engaging with said teeth for any set amount by an adjustable uncoupling cam or the like, movable between the wheel and the pawl, said wheel being operatively connected to the printing and delivering mechanism as well as the coupon counting mechanism of the register.

The invention will be more readily understood from the following description of the form illustrated by way of example in the accompanying drawings. In the drawings, the money drawers, indicating mechanism and the driving crank have been omitted. As is known, in such registers the amount is set by pressing keys or setting levers.

Figure 2:
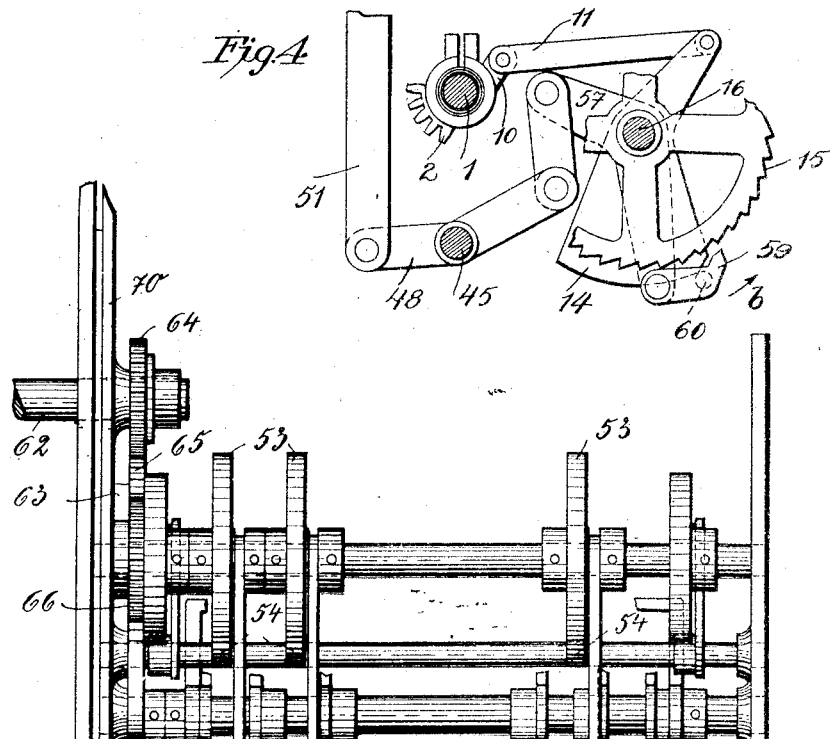
Figure 3:
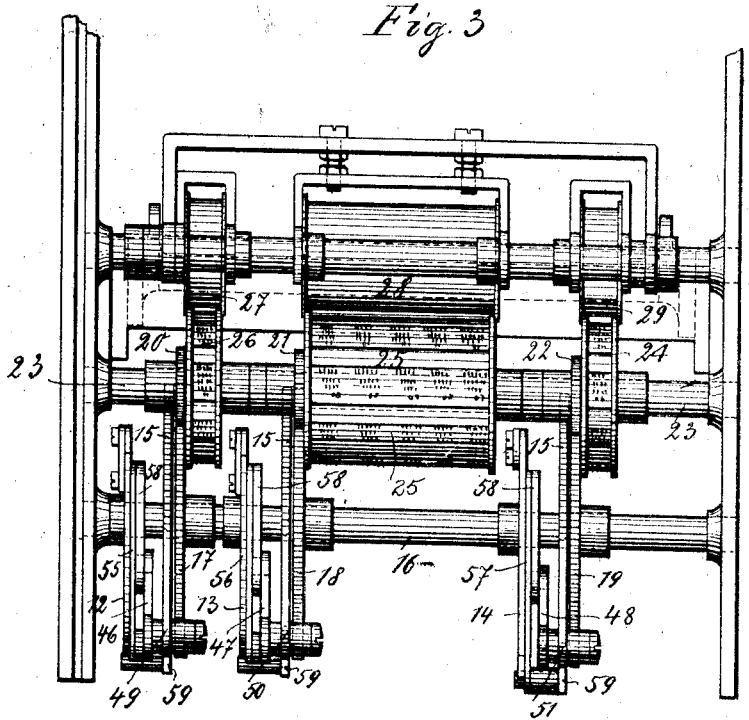
Figure 5:
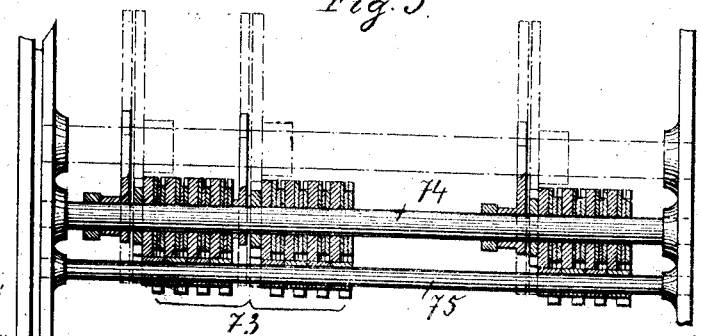

In the drawings: Figure 1 is a side view of the register with one of the cheek plates removed to disclose the printing counting and delivering mechanism together with its operating mechanism. Fig. 2 is a rear view looking on the left in Fig. 1, the printing rollers and a part of the operating mechanism being omitted. Fig. 3 is a rear view of the mechanism shown in Fig. 1, in this case the printing and the remainder of the operating mechanism omitted in Fig. 2 being shown, while the parts shown in Fig. 2 are omitted. Fig. 4 is a detail view of the actuating mechanism for the printing and delivering mechanism for tens of pfennigs. Fig. 5 is a separate plan view of the counting mechanism which is of known construction. Fig. 6 is a rear view of a conventional form of setting mechanism for setting the tubular shafts hereinafter referred to. Fig. 7 is an end view of Fig. 6.

According to the form of the invention illustrated, a number of concentric tubular shafts 1, lead from the setting mechanism which is of conventional construction and forms no part of this invention but is arranged to the left of the side cheek $a$. As shown, the setting mechanism may comprise hand operated segments 30 mounted on a shaft 31 and connected by links 32 and 33 to the tubular shafts 1, the segments 30 being retained in position, when operated, by the catches 34, four setting segment levers 30 being shown adapted to register, tens and units of marks and tens and units of pfennigs respectively.

The outer tubular shaft carries a toothed segment 2, the next inner tube carries the segment 3, the next the segment 4, and the innermost shaft which may be solid, carries the segment $4^a$. It will be understood that the shafts 1 are separately rotatable and are moved by an amount corresponding to the purchase registered. The segments 2, 3, 4 and $4^a$ gear with segments 5, 6, 7 and $7^a$ which are also carried on separate concentrically arranged shafts. The toothed segments 5, 6, 7 and $7^a$ are arranged to set types which print the amount of the purchase on a moving strip. This strip and the printing mechanism therefor do not form part of the present invention and are not illustrated in the drawings.

The segments 2, 3, and 4 are each provided with a lever or arm 8, 9, and 10 respectively (see Figs. 1, 4 and 7), and these arms are connected by rods 11 (Figs. 1, 4 and 7) to the operating arm of cam plates 12, 13, 14, which rotate on an axis 16. The axis 16 is supported between the cheek plates $a$ and $b$. The cam plates 12, 13 and 14 are in the form of segments and constitute uncoupling members.

On the shaft 16, three ratchet wheels 15 are also rotatably arranged and on the hubs of these ratchet wheels there are fixed the toothed wheels 17, 18 and 19. These toothed wheels are adapted to engage with pinions 20, 21, 22 which are loosely mounted on the shaft 23 and are fixed to the type rollers 24, 25, 26. The roller 24 is narrow and is assumed to deliver single coupons representing each 10M. of the purchase; the roller 25 is wide and each unit rotation of this roller delivers 5 coupons, each representing 20 pfg. of the purchase so that this roller represents the unit marks of the purchase, while the roller 26 is narrow and is assumed to deliver one coupon for each complete 20 pfg. of the odd pfennigs in the purchase.

On the type wheels 24, 25, 26 there rest the co-acting press rollers 27, 28, 29 which are raised and lowered by cam mechanism to effect the feeding, printing and delivering of the coupons. The coupons are fed through trunks $c$ from rollers $d$ and when the coupons have been fed forward and printed they are separated off by cutting mechanism $\ell$, which is also controlled from cams on the operating shaft 52.

The operating shaft 52 in addition to operating the press rolls 27, 28, 29 and the cutting mechanism $e$, is provided with cams 53 which have grooves 66 in which rollers 54 work. The rollers 54 are carried by rods 49, 50, 51 which connect to levers 46, 47, 48 fulcrumed at 45. The levers 46, 47 and 48 are in turn connected by links 58 to the bent levers 55, 56, 57 which are fulcrumed on the shaft 16. Each of the longer arms of the levers 55, 56, 57 carries a pawl 59 which has a side projecting pin 60 adapted to coact with the corresponding uncoupling cam plate 12, 13 or 14 under the action of a spring 77.

The counting mechanism (Figs. 1 and 5) is of known type comprising counting wheels 73 geared to the toothed wheels 17, 18 and 19, the registering wheels being geared to the counting wheels and being mounted on the shaft 75. 76 are pawls mounted rotatably on shaft 74 for preventing return movement of the ratchet wheels 15.

The operation of this device is as follows:—It will be assumed that the register is arranged to register purchases ranging from 1 pfg. to 99,99 marks. Supposing, for example, that a purchase of the value of 13 marks 57 pfennigs is made. The operator moves the setting lever 30 at the right of Fig. 6 one place, thereby registering 10 marks. The lever 30 to the left of this is then moved three places to register 3 marks. Likewise the other two levers 30 are moved to register 50 and 7 pfennigs respectively. The operation of these levers 30 causes the concentric rotatable shafts 1 to be correspondingly rotated in the direction indicated by the arrow $a$ in Fig. 1 to various angular positions. Before the shafts 1 are operated, the cams 12, 13 and 14 assume a position about 90° in the direction of the arrow $b$ relative to the position shown in Fig. 1, and in such position the pin 60 on the pawl 59 would ride upon the cam during the entire swinging movement of the pawl without engaging with the ratchet wheel 15. When one of the levers 30 is operated however, the corresponding cam 12, 13 or 14 is moved a distance corresponding to the amount registered by means of the lever 11 connected to the rotatable shaft 1. As the toothed segment $4^a$ operated by the unit pfennig lever, has however no corresponding cam and ratchet, no coupons are delivered for unit pfennigs. After setting the lever 30 the shaft 62 is rotated one revolution thereby giving one revolution to the shaft 52 and the cams 53 through the gear wheels 64, 65 and 66. The levers 46, 47 and 48 are thereby caused to swing by the action of the levers 49, 50 and 51, movement being transmitted to the bell-crank levers 55, 56 and 57 carrying the pawls 59 through the links 58, the pawls thus making one complete swing. Overrunning is prevented by the shaft 61, the pawls at the end of their movement jamming between the shaft 61 and ratchet wheels 15 and thus preventing further movement. The pawls corresponding to the units and tens of marks always move over a distance equal to 9 teeth but the cams 12 and 13 only allow the same to engage with the ratchet wheels 15 according to the amount registered. For example, 10 marks being registered by the lever 30 registering tens of marks, the cam 12 is in such a position, that the pin 60 on the pawl 59 rides on the cam for 8 teeth and then allows the pawl to engage and rotate the ratchet wheel one tooth. This rotation is transmitted by the gear wheels 19 and 22 to the type roller 24 and rotates the same sufficiently to print one coupon of the value of 10 marks. In the case of the unit marks the pin 60 rides on the cam 13 for the first 6 teeth and then allows the pawl to rotate the ratchet wheel a distance of three teeth, the rotation being likewise transmitted to the type roller 25 and causing the same to rotate so as to bring three rows of type in succession into printing position, and, as the type roller 25 is adapted to print 5 coupons in each row, 15 coupons are thereby issued, each of the value of 20 pfg. The registering device for tens of pfennigs operates however somewhat differently. One coupon is issued for each complete 20 pfg. and by special arrangement of the levers (see Fig. 4) the pawl 59 corresponding to the tens of pfennigs only moves over 4 teeth. If therefore the lever 30 is caused to register 20 pfgs. the pawl 59 only moves over 1 tooth, and likewise when moved to register an odd number of tens of pfennigs (50 in the example hereinbefore given) the pawl 59 only moves over a number of teeth equal to the number of complete 20 pfgs. registered, in this case, therefore, over 2 teeth. The type roller 26 thus prints 2 coupons each of the value of 20 pfgs. When the shaft 52 has almost completed one revolution, the knife e is operated and cuts off the printed coupons from the strips.

The number of coupons delivered is counted by means of the counting and registering wheels 73, 75 which are actuated by the rotation of the gear wheels 17, 18 and 19 and consequently in accordance with the operation of the type rollers 24, 25 and 26.

I claim:

1. In a cash register, means for printing, counting and delivering coupons corresponding in number to the multiple which the purchase is of a predetermined amount, comprising in combination, a driven member operating the counting and printing mechanisms and moved over the desired distance by a driving member which moves over a constant distance at each actuation of the register, and means for coupling and uncoupling said driving and driven members during a period variable according to the amount of the purchase so as to deliver the corresponding number of coupons.

2. In a cash register, means for printing, counting and delivering coupons corresponding in number to the multiple which the purchase is of a predetermined amount, comprising in combination a driven member operating the counting and printing mechanisms, a driving pawl, means for moving the driving pawl over a constant distance at each actuation of the register, said pawl coacting with said driven member and means for coupling and uncoupling said driving pawl and driven member during a period variable according to the amount of the purchase so as to move said driven member over the required distance and deliver the corresponding number of coupons.

3. In a cash register, means for printing, counting and delivering coupons corresponding in number to the multiple which the purchase is of a predetermined amount, comprising in combination, a driving pawl, means for moving said pawl over a constant distance at each actuation of the register, a ratchet coacting with said pawl and operating the counting and printing mechanisms, and means for coupling and uncoupling said pawl and ratchet during a period variable according to the number of coupons to be issued, whereby said ratchet operates the printing and counting mechanisms to the desired extent.

4. In a cash register, means for printing, counting and delivering coupons corresponding in number to the multiple which the purchase is of a predetermined amount, comprising in combination, a rotatable shaft whose position depends upon the amount registered, a cam plate, means for mechanically coupling said cam plate to said shaft to move proportionally to the same, a driven member, a driving member therefor and coacting with said cam plate to render the same operative to drive said driven member as required, means for moving said driving member through a fixed predetermined distance and printing, delivering and counting mechanism operatively connected to said driven member.

5. In a cash register having printing and adding mechanisms, means for printing, counting and delivering coupons corresponding in number to the multiple which the purchase is of a predetermined amount, comprising in combination a rotatable shaft whose position depends upon the amount registered, a cam plate, means for mechanically coupling said cam plate to said shaft to move proportionally to the same, a pawl, means for moving said pawl through a fixed predetermined distance, a pin on said pawl adapted to ride on said cam plate for a distance proportional to the setting of the same, a member driven by said pawl and printing, counting and delivering mechanism operatively connected to said driven member.

6. In a cash register having printing and adding mechanisms, means for printing, counting and delivering coupons corresponding in number to the multiple which the purchase is of a predetermined amount, comprising in combination a rotatable shaft whose position depends upon the amount registered, a cam plate, means for mechanically coupling said cam plate to said shaft to move proportionally to the same, a pawl, means for moving said pawl through a fixed predetermined distance, a pin on said pawl adapted to ride on said cam plate for a distance proportional to the setting of the same, a ratchet with which said pawl is arranged to co-act and printing, counting, and delivering mechanism operatively connected to said ratchet.

7. In a cash register having printing and adding mechanisms, means for printing, counting and delivering coupons corresponding in number to the multiple which the purchase is of a predetermined amount, comprising in combination a driving shaft adapted to make complete rotations, a rotatable shaft adapted to make partial rotations, a cam on said driving shaft, a pawl, transmission levers arrangned between said cam and said pawl, an arm on said rotatable shaft, a rotatable segmental cam plate arranged alongside said pawl, transmission levers between said arm on the rotatable shaft and said cam plate, a pin on the pawl adapted to ride on said segmental cam plate, a ratchet wheel driven by said pawl and printing, counting and delivery mechanism operatively connected to said ratchet.

8. In a cash register having printing and adding mechanisms, means for printing, counting and delivering coupons corresponding in number to the multiple which the purchase is of a predetermined amount, comprising in combination a driving shaft adapted to make complete rotations, a rotatable shaft adapted to make partial rotations, a cam on said rotary shaft, a pawl, transmission levers arranged between said cam and said pawl, an arm on said rotatable shaft, a rotatable segmental cam plate arranged alongside said pawl, transmission levers between said arm on the set shaft and said cam plate, a pin on the pawl adapted to ride on said segmental cam plate, a ratchet wheel driven by said pawl and a bar with which said pawl engages near the end of its forward movement to stop said pawl and ratchet.

In witness whereof I have hereunto set my hand in the presence of two witnesses.

CARL TROG.

Witnesses:
J. M. BOWCOCK,
OTTO ALTENBURG.